Oct. 22, 1968

F. O. BACH ETAL 3,407,064

ELECTROPHOTOGRAPHIC OFFSET MASTER CONTAINING A COATING
OF INSOLUBILIZED POLYACRYLIC ACID AND METHOD
OF MANUFACTURE

Filed April 1, 1965

INVENTORS
Frederick O. Bach
Paul E. Frasher
by McDougall, Hersh & Scott
Attys 3,407,064
ELECTROPHOTOGRAPHIC OFFSET MASTER CONTAINING A COATING OF INSOLUBILIZED POLYACRYLIC ACID AND METHOD OF MANUFACTURE
Frederick O. Bach, Villa Park, and Paul E. Frasher, Chicago, Ill., assignors to A. B. Dick Company, Niles, Ill., a corporation of Illinois
Filed Apr. 1, 1965, Ser. No. 444,624
13 Claims. (Cl. 96—1.8)

ABSTRACT OF THE DISCLOSURE

An offset master which is capable of being imaged by electrophotographic technique formed of a base sheet having a continuous electrophotographic coating on the surface of the base sheet formed of zinc oxide in a resinous binder and a thin hydrophilic coating of an insolubilized polyacrylic acid present as an overcoating on the surface of the electrophotographic coating which provides a hydrophilic surface through which the electrostatic image is effective for receiving a hydrophobic developing material on the insolubilized polyacrylic acid surface to define the ink receptive image thereon.

---

This invention relates to a new and improved lithographic master, and more particularly to a lithographic master adapted for imaging by electrophotographic technique.

Electrophotographic processes for the production of copy from an original, as in the processes known commercially as the Xerox process and the Electrofax process, make use of a copy surface in the form of a base sheet having a surface coating of a photoconductor such as fabricated of a suitable zinc oxide suspended in a resinous binder preferably into the ratio of about 2–8 parts by weight of zinc oxide to one part by weight of the resinous binder.

Zinc oxides which are suitable for use in such electrophotographic coatings are those which are substantially electrically non-conductive in the dark. When exposed to light, they should have a surface photoconductivity of a certain level in order to be of practical use in the electrophotographic copy process. In testing zinc oxides in order to determine their suitability, it is convenient to express the results of the measurement as surface photoconductivity because substantially all of the light is absorbed within the thin layer at the surface of the zinc oxide. It has been found that to be useful as a component in the electrophotographic coating, the zinc oxide should have a surface photoconductivity of at least $10^{-9}$ ohm$^{-1}$/square/watt/cm.$^2$. Zinc oxides suitable for such electrophotographic coatings include Florence Gren Seal No. 8 marketed by the New Jersey Zinc Company, Palmerton, Pa.; U.S.P. XIV marketed by Mallinckrodt Chemical Works, New York, N.Y.; U.S.P. zinc oxide marketed by Eagle-Picher Sales Company, Philadelphia, Pa., and Cat. No. Z–53 marketed by Fischer Scientific Company, Division of Eimer and Amend Company, New York, N.Y.

As the resinous binder, it is desirable to make use of a synthetic resinous material having a relatively high dielectric constant and high dielectric strength such as a styrenated alkyd resin, polyvinyl acetate, copolymers of vinyl chloride-vinyl acetate, polystyrene, butadiene-styrene copolymer, silicones, polyester alkyd resins and the like, or other film-forming materials such as cellulose ethers and esters, and natural resins such as shellac, waxes, and the like.

Characteristic of the described film-forming binder is the fact that such materials are highly hydrophobic and therefore present a highly water-repellent and ink-receptive surface whereby such surfaces are inherently incapable of use as the ink-repellent, water-receptive, non-imaged portion of an imaged lithographic plate. In the attempt to make use of such base sheets as a lithographic plate imaged by electrophotographic technique, strong acidic etches have been applied to the non-imaged portions of the plate for conversion of the non-imaged portions from a hydrophobic to a hydrophilic surface.

Such strong acid etches are formulated of extremely toxic materials. Great care is required in their application to avoid blinding of the image. Care is required in the application to avoid scum formation in the non-imaged areas or toning in the non-imaged areas.

It is an object of this invention to produce an electrophotographic offset master, and it is a related object to provide a new and improved method for imaging same.

More particularly, it is an object of this invention to produce an electrophotographic lithographic master which can be imaged without the use of strongy acidic substances for conversion of the non-imaged portions to render such portions ink-repellent and water-receptive while the imaged portions remain ink-receptive and water-repellent; which does not make use of highly toxic materials in the preparation of the imaged plate; which does not require highly skilled labor and care in the preparation of the plate; which results in a plate that is relatively free of toning or scumming in the non-imaged areas of the plate, and which can be imaged by conventional electrophotographic technique without the need for reaction to convert the non-imaged portions of the plate to render the surfaces ink-repellent and water-receptive.

These and other objects and advantages of this invention will hereinafter appear and, for purposes of illustration, but not of limitation, an embodiment of the invention is shown in the accompanying drawing, in which.

Figure 1:
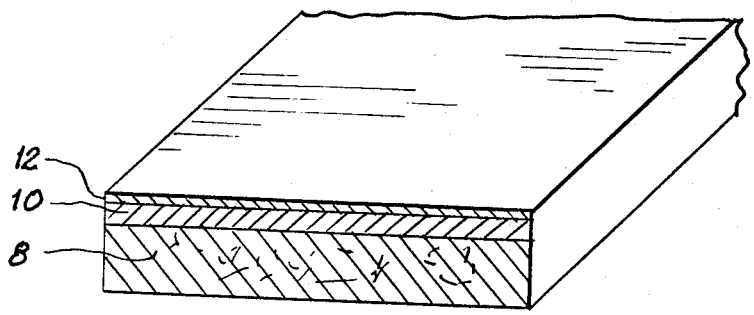
FIGURE 1 is a perspective view partially in section of a lithographic master embodying the features of this invention.
Figure 2:
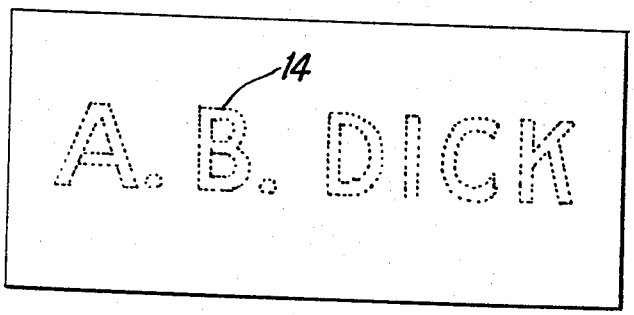
FIGURE 2 is a top plan view of the master of FIGURE 1 having a latent electrostatic image formed thereon by conventional electrophotographic technique.
Figure 3:
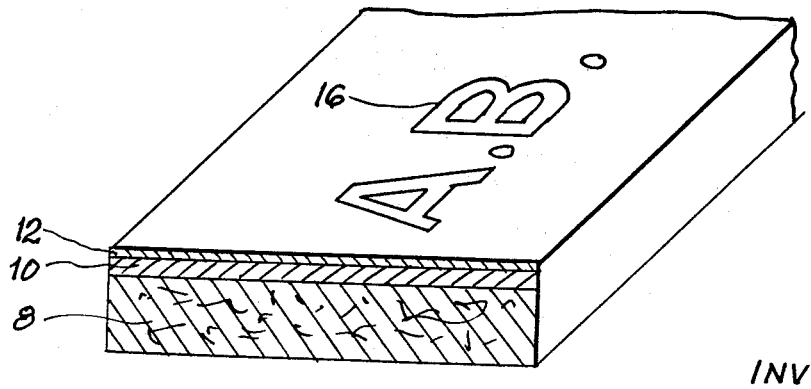
FIGURE 3 is a perspective view partially in section of the imaged lithographic master.

The objective of this invention can be achieved, in accordance with the practice of this invention, by treatment of the zinc oxide-resinous binder coating 10 with an over-coating 12 of an insolubilized polyacrylic acid which operates to render the surface ink-repellent, water-receptive, and hydrophilic without interfering with the electrophotographic characteristics of the layer 10 of the zinc oxide-resinous binder to receive and hold a latent electrostatic image 14 which can be developed by conventional developing compositions to produce an ink-receptive, water-repellent image 16 on the hydrophilic surface of the over-coating 12 of insolubilized polyacrylate.

The polyacrylic acid can be applied as an over-coat directly onto the electrophotographic coating 10 of zinc oxide and resinous binder with reliance upon reaction between the polyacrylic acid and zinc oxide present in the underlying coating to form the insolubilized zinc polyacrylate. Instead, the polyacrylic acid can be applied as an over-coat from a solution containing a zinc salt or a salt of a metal other than zinc which is capable of reaction with polyacrylic acid to produce the insolubilized polyacrylate over-coating 12 but in which the metal salt does not interfere with the essential electrophotographic properties of the underlying zinc oxide-resinous binder layer 10 for image development by conventional electrophotographic technique. The polyacrylic acid can also be applied as an over-coating in the layer of zinc oxide-resinous binder, after which the dried coating can be insolubilized to water by treatment with a wash coat having in solution a zinc salt or salt of another metal which is capable of reaction with the polyacrylic acid to form a water-insolubilized polyacrylate but in which the metal salt, as in the combination with the polyacrylic acid, is one that does not interfere with the electrophotographic properties of the layer 10 formed of zinc oxide and resinous binder.

The polyacrylic acid should be applied in an amount and in a manner to produce an essentially continuous layer 12 over-coating the electrophotographic layer 10 of zinc oxide-resinous binder. It is preferred to make use of an over-coating of the smallest dimension possible but not so small as to become integrated into the zinc oxide-resinous binder layer, since otherwise the desired modification of the surface to provide the hydrophilic characteristics will not be obtained. For this purpose, use can be made of a combination containing as little as 0.5% by weight polyacrylic acid in solution or an aqueous dispersion. When the underlying coating is porous, a more viscous composition, having a solids content as high as 10% or more, can be used.

When the over-coating composition is formulated to contain a metal salt for insolubilization of the polyacrylic acid or when the metal salt is embodied in a wash coat, such salt can be selected of a metal such as zinc, aluminum, iron, chromium, cobalt, zirconium, and titanium and the like in the form of the chloride, acetate, lactate, sulphate, and the like systems. For such purpose, the salt can be employed in solution in aqueous medium in an amount within the range of 0.1% to 10% by weight, and preferably in an amount within the range of 0.5% to 3% by weight.

It is desirable to heat the over-coated plate for purposes of enhancing the reaction to water-insolubilize the coating by formation of the corresponding metal acrylate but insolubilization can be effected without heating. When the plate is heated, it is desirable to make use of the temperature which does not exceed about 350° F., and it is preferred to heat the plate at a temperature within the range of 100° to 250° F.

Having described the basic concepts for the production of an electrophotographic offset master having an electrophotographic layer 10 within an insolubilized lithographic, hydrophilic over-coating 12 which can be imaged to produce an imaged lithographic master without the need to apply an etch or acid for conversion of the non-imaged portions of the plate, examples will now be given, for purposes of illustration but not of limitation, of the preparation and use of masters or plates embodying the features of this invention.

Example I

In the preparation of an electrophotographic plate, a paper base sheet 8 is provided with a coating of zinc oxide in a styrenated alkyd resin in the ratio of 8 parts by weight zinc oxide to one part by weight of styrenated alkyd resin. The coating is applied from aqueous dispersion in a coating weight of twenty pounds per 3,000 square feet of surface area. The base sheet 8, whether formed of paper, metal or plastic foil or film, should be electrically conductive or else capable of being rendered conductive during the imaging process, as by wetting the paper and the like.

The paper base sheet 8 with the zinc oxide-styrenated alkyd resinous coating 10 is over-coated with a 1% solution of polyacrylic acid and the over-coated sheet is heated at a temperature of 250° F. for from one-half to three minutes.

The resulting master can be processed by conventional electrophotographic technique by exposing the surface of the coating to corona discharge whereby an over-all electrostatic charge is acquired by the surface. The charged plate can then be exposed in the conventional manner of the Xerox or Electrofax process, either photographically, by reflex, or directly through a negative transparency whereby the electrostatic charge is destroyed in the exposed areas and retained in the unexposed areas to provide a latent electrostatic image 14 that can be developed either by a dry developing powder and fused or by a liquid developer to produce an ink-receptive, water-repellent image 16 on the lithographic surface of the insolubilized over-coating 12 of polyacrylate.

The imaged plate can be run on a lithographic press to produce copies without the need for an intermediate acid etch or conversion solution of the type heretofore required.

Example II

A 2002 series master of Addressograph-Multigraph is over-coated with an aqueous solution containing 1% by weight polyacrylic acid and 2% by weight zinc acetate with sufficient ammonia to retain the materials in solution. The coating composition is wiped or otherwise applied onto the surface of the plate and dried.

Example III

An SCM electrostatic offset master is over-coated by roller coating, brush coating, dip coating, spray coating, or swabbing with an aqueous solution containing 2% polyacrylic acid. After drying, the over-coating of polyacrylic acid is swabbed with a cotton pad wet with a 1% solution of zinc chloride and the plate is heated to a temperature of 150° to 200° F. for about one to five minutes.

The Addressograph-Multigraph 2002 series master and the SCM electrostatic offset master comprise paper base sheets having an electrophotographic coating formulated of zinc oxide and a resinous binder such as a silicone.

The plates produced in Examples II and III can be processed in the same manner as that described in Example I for the production of a latent electrostatic image on the surfaces thereof followed by development of the image with an ink-receptive, water-repellent material to produce an imaged master from which multiple copies of good quality can be produced by conventional lithographic technique.

It will be apparent from the foregoing that we have produced a lithographic master which is capable of being imaged directly by electrostatic technique and in which the imaged plate can be mounted on a lithographic press for the production of copy without the need for conversion of the non-imaged portions of the plate to present a hydrophilic lithographic surface.

It will be understood that changes may be made in the details of construction and formulation without departing from the spirit of the invention, especially as defined in the following claims.

We claim:
1. An offset master capable of being imaged by electrophotographic technique comprising a base sheet, a continuous electrophotographic coating on the surface of the base sheet formed of zinc oxide in a resinous binder and a thin hydrophilic coating of an insolubilized polyacrylic acid as an overcoating on the surface of the electrophotographic coating.

2. An offset master capable of being imaged by electrophotographic technique comprising a base sheet, a continuous electrophotographic coating on the surface of the base sheet formed of zinc oxide in a resinous binder and a continuous overcoating on the electrophotographic coating formed of a thin hydrophilic coating of polyacrylic acid insolubilized with a metal salt which does not interfere with the electrophotographic properties of the underlying electrophotographic coating.

3. An offset master capable of being imaged by electrophotographic technique comprising a base sheet, a continuous electrophotographic coating on the surface of the base sheet formed of a zinc oxide in a resinous binder, and an overcoating of a thin, water-insoluble hydrophilic coating of zinc polyacrylate on the surface of the electrophotographic coating.

4. The method for preparation of an offset master having an electrophotographic coating of zinc oxide in a resinous binder without the need for treatment of the surface after imaging for conversion of the surface to render the surface hydrophilic comprising applying a thin coating of polyacrylic acid as an overall coating onto the electrophotographic coating, and insolubilizing the applied coating of polyacrylic acid.

5. The method as claimed in claim 4 in which the polyacrylic acid coating is applied from a composition containing the polyacrylic acid in an amount within the range of .5% to 10% by weight.

6. The method for preparation of an offset master having an electrophotographic coating of zinc oxide in a resinous binder without the need for treatment of the surface after imaging for conversion of the surface to render the surface hydrophilic comprising overcoating the electrophotographic coating with a thin coating of a polyacrylic acid and a salt of a metal which reacts with polyacrylic acid to form an insolubilized corresponding polyacrylate and which does not interfere with the electrophotographic properties of the underlying coating of zinc oxide in the resinous binder, and drying the coating.

7. The method as claimed in claim 6 in which the polyacrylic acid is present in the coating composition in an amount within the range of 0.5% to 10% by weight and in which the metal salt is present in the coating composition in an amount within the range of 0.1% to 10% by weight.

8. The method as claimed in claim 7 in which the metal salt is present in the coating composition in an amount within the range of 0.5% to 3% by weight.

9. The method as claimed in claim 6 in which the metal salt is a water-soluble zinc salt.

10. The method for preparation of an offset master having an electrophotographic coating of zinc oxide in a resinous binder without the need for treatment of the surface after imaging for conversion of the surface to render the surface hydrophilic comprising applying a coating composition onto the electrophotograpic coating containing polyacrylic acid, drying the coating, and then wash-coating the dried layer of polyacrylic acid with a dilute solution of a salt of a metal selected from the group consisting of zinc, aluminum, iron, chromium, cobalt, zirconium and titanium.

11. The method as claimed in claim 10 in which the polyacrylic acid is present in the coating composition in an amount within the range of .5% to 10% by weight.

12. The method as claimed in claim 10 in which the metal salt is present in the wash-coat in an amount within the range of 1% to 10% by weight.

13. The method as claimed in claim 10 in which the metal salt in the wash-coat is a water-soluble zinc salt.

References Cited

UNITED STATES PATENTS

| | | | |
|---|---|---|---|
| 2,904,526 | 9/1959 | Uelzmann | 260—23 |
| 2,930,768 | 3/1960 | Hopkins | 260—2.2 |
| 3,211,686 | 10/1965 | Uber | 260—29.6 |
| 3,272,121 | 9/1966 | Uber et al. | 101—149.2 |

FOREIGN PATENTS

| | | |
|---|---|---|
| 888,371 | 1/1962 | Great Britain. |
| 888,372 | 1/1962 | Great Britain. |

NORMAN G. TORCHIN, *Primary Examiner.*

J. C. COOPER, *Assistant Examiner.*